(12) United States Patent
Kagawa et al.

(10) Patent No.: US 7,938,998 B2
(45) Date of Patent: May 10, 2011

(54) EASY-TO-STRAIGHT-TEARING THERMOPLASTIC RESIN FILM AND ITS PRODUCTION METHOD AND APPARATUS

(76) Inventors: Seiji Kagawa, Saitama-ken (JP); Yoichiro Kagawa, Saitama-ken (JP)

( * ) Notice: Subject to any disclaimer, the term of this patent is extended or adjusted under 35 U.S.C. 154(b) by 59 days.

(21) Appl. No.: 12/556,390

(22) Filed: Sep. 9, 2009

(65) Prior Publication Data
US 2010/0007050 A1 Jan. 14, 2010

Related U.S. Application Data

(62) Division of application No. 10/512,413, filed as application No. PCT/JP03/05354 on Apr. 25, 2003, now abandoned.

(30) Foreign Application Priority Data
Apr. 25, 2002 (JP) ................ 2002-125045

(51) Int. Cl.
B29C 59/04 (2006.01)
(52) U.S. Cl. ............ 264/162; 264/210.2; 264/293; 425/366; 53/133.8
(58) Field of Classification Search .......... 264/162, 264/210.2, 293; 425/366; 53/133.5, 133.8
See application file for complete search history.

(56) References Cited

U.S. PATENT DOCUMENTS

| | | | |
|---|---|---|---|
| 2,923,052 A * | 2/1960 | Marogg | 29/76.1 |
| 4,543,279 A | 9/1985 | Kai | |
| 4,581,087 A | 4/1986 | Johnson | |
| 4,859,519 A | 8/1989 | Cabe, Jr. et al. | |
| 5,257,923 A * | 11/1993 | Kagawa | 425/290 |
| 5,512,337 A | 4/1996 | Littmann et al. | |

FOREIGN PATENT DOCUMENTS

| | | |
|---|---|---|
| JP | 58-160251 A | 9/1983 |
| JP | 60-228699 A | 11/1985 |
| JP | 03-301 B | 2/1987 |
| JP | 2-135152 | 11/1990 |
| JP | 3-27912 A | 2/1991 |
| JP | 3-109790 | 11/1991 |
| JP | 04-091945 A | 3/1992 |
| JP | 05-042951 A | 2/1993 |
| JP | 7-88949 A | 4/1995 |
| JP | 07-088949 A | 4/1995 |
| JP | 7-257632 A | 10/1995 |
| JP | 11-207811 | 8/1999 |
| JP | 2000-351160 A | 12/2000 |
| JP | 2002-59487 A | 2/2002 |
| JP | 2002-080705 | 3/2002 |
| JP | 02-120194 A | 4/2002 |
| WO | 97/13633 A1 | 4/1997 |

* cited by examiner

Primary Examiner — Philip C Tucker
Assistant Examiner — Alison Hindenlang
(74) Attorney, Agent, or Firm — Sughrue Mion, PLLC

(57) ABSTRACT

A method for forming substantially parallel linear scratches on a thermoplastic resin film, comprising bringing the film into sliding contact with a means having a lot of fine projections for forming linear scratches, and pressing the film onto the linear-scratch-forming means from the opposite side of the linear-scratch-forming means by a film-pressing means, in a region in which the film is in sliding contact with the linear-scratch-forming means.

10 Claims, 12 Drawing Sheets

EASY-TO-STRAIGHT-TEARING THERMOPLASTIC RESIN FILM AND ITS PRODUCTION METHOD AND APPARATUS

CROSS REFERENCE TO RELATED APPLICATIONS

This is a Divisional of application Ser. No. 10/512,413 filed Oct. 25, 2004, now abandoned which is a National Stage Entry of PCT/JP03/05354 filed Apr. 25, 2003.

FIELD OF THE INVENTION

The present invention relates to a thermoplastic resin film easy to straight tear in one direction, and a method and apparatus for producing such a film.

BACKGROUND OF THE INVENTION

In recent progress of barrier-free items, easy opening is considered to be an important function for wrapping films. Typical methods for making the wrapping bags easily openable include a method of providing the wrapping bags with cutting-start points such as V-shaped notches, etc. in their edge portions (heat-sealing portions), and methods needing no cutting-start points such as a magic cut method, a fancy cut method and a method of providing the wrapping bags with fine pores.

The magic cut and the fancy cut comprise providing the wrapping bags with fine scratches in their edge portions and bending portions in place of notches. However, even with the magic cut or the fancy cut, it has been difficult to open the wrapping bags straight in directions not aligned with the molecular orientation of plastic films. Further, when cut lines progress in conventional easy-to-open wrapping bags beyond their edge portions to regions in which contents are included, the cut lines are likely to unintentionally go toward the regions having contents even though plastic films for the bags have molecular orientation, resulting in falling, dropping or scattering of the contents.

Working for making a plastic film porous (porous working) is to form a lot of fine penetrating or non-penetrating pores on the entire surface of the film. Thus, wrapping bags of films subjected to the porous working can be opened from any position without notches regardless of the directions of the films. Accordingly, even if an opening operation is temporarily stopped, the bags can be opened to the end. However, because films for wrapping food, etc. are required to have moistureproofness, the film subjected to the porous working should be laminated as an outermost film.

JP 2002-80705 A discloses an easy-to-tear, biaxially stretched polyester film, which can be easily torn straight. However, when used for applications of wrapping films requiring moistureproofness, the biaxially stretched polyester films should not be used alone but laminated with polyolefin films, etc., to provide wrapping films.

Vapor-deposited transparent films are widely used as gas-barrier films to wrap food, medicine, high-precision electronic parts, etc. However, because the vapor-deposited transparent films are composed of thermoplastic resin films vapor-deposited with metals, metal oxides, etc. and coated with resins, they have insufficient easy-to-tear characteristics even though the plastic base films have easy-to-tear characteristics.

For instance, cut tapes are attached to wrapping films for triangular rice balls sold at convenience stores and the like to enable cutting in a strip shape. To adhere the cut tapes to the films, transfer methods are usually used. As a result, the films cannot be moved at a high speed in the production of the wrapping films, resulting in low productivity and high production cost.

OBJECTS OF THE INVENTION

Accordingly, an object of the present invention is to provide an inexpensive thermoplastic resin film easily torn straight in one direction regardless of the orientation of the original film, free from the above-mentioned defects of the conventional films.

Another object of the present invention is to provide a method for producing such a film.

A further object of the present invention is to provide an apparatus for producing such a film.

SUMMARY OF THE INVENTION

As a result of intensive research in view of the above objects, the inventors have found that a thermoplastic resin film having substantially parallel linear scratches at least on one surface has easy-to-straight-tear characteristics, and that the linear scratches are formed by a linear-scratch-forming means such as a roll, a plate, etc. with a lot of fine projections on the surface, which is in sliding contact with the film at a proper pressure.

Thus, the easy-to-straight-tear thermoplastic resin film of the present invention has substantially parallel linear scratches formed at least on one surface, so that it is easily torn straight from any point along the linear scratches.

The depth of the linear scratches is preferably 1 to 40% of the thickness of the easy-to-straight-tear thermoplastic resin film. It is preferable that the depth of the linear scratches is 0.1 to 10 µm, that the width of the linear scratches is 0.1 to 10 µm, and that the intervals of the linear scratches are 10 to 200 µm.

The easy-to-straight-tear thermoplastic resin film of the present invention may further have a lot of fine penetrating and/or non-penetrating pores uniformly. The easy-to-straight-tear thermoplastic resin film of the present invention may be a single-layer film or a laminate film. The laminate film preferably has at least one film layer having the linear scratches, and a sealant film layer.

The production method of the easy-to-straight-tear thermoplastic resin film of the present invention comprises bringing the film into sliding contact with a means having a lot of fine projections for forming linear scratches, and pressing the film onto the linear-scratch-forming means from the opposite side of the linear-scratch-forming means by a film-pressing means, in a region in which the film is in sliding contact with the linear-scratch-forming means, whereby substantially parallel linear scratches are formed on the film.

A roll or plate having a lot of hard fine particles on its surface is preferably used as the linear-scratch-forming means. The fine particles are preferably particles having a Mohs' hardness of 5 or more, particularly fine diamond particles.

In one preferred embodiment of the present invention, the film-pressing means is an air-blowing means. Air blowing makes it possible to apply a substantially uniform pressure onto the film surface in sliding contact with the linear-scratch-forming means. The pressure of an airflow blown onto the film is preferably 0.05 to 5 kgf/cm$^2$. Preferable as an air-blowing means is a blower or a nozzle.

In another preferred embodiment of the present invention, the film-pressing means is a brush brought into sliding contact with the film. The brush preferably has hairs having a recovery-from-bending ratio of 70% or more, a diameter of 0.1 to 1.8 mm, and a length of 1 to 8 cm. The brush hairs brought into sliding contact with the film have a density of 100 to 500/cm² on the brush-sliding surface. The brush is preferably in sliding contact with the film at a pressure of 0.01 to 5 kgf/cm² on the brush-sliding surface.

The outer diameter of the roll is preferably 2 to 20 cm. A tension of 0.01 to 5 kgf/cm (width) is preferably applied to the film in sliding contact with the linear-scratch-forming means. The moving speed of the film is preferably 10 to 500 m/minute.

In a further preferred embodiment of the present invention, the linear scratches are formed in the film-moving direction by the roll or plate, whose position is fixed with respect to the width direction of the film. It is preferable that the rotation axis of the roll is parallel with the width direction of the film, and that the roll is rotated at a lower peripheral speed than the moving speed of the film in an opposite direction to the moving direction of the film. The peripheral speed of the toll is preferably 1 to 50 m/minute. The roll is preferably longer that the film width to have contact with the film over its entire width.

In a still further preferred embodiment of the present invention, an endless pattern belt longer than the width of the film comprises small rolls or plates having a lot of hard fine particles on the surface in parallel. The endless pattern belt is arranged in the width direction of the film such that each small roll or plate can be in sliding contact with the film. The endless pattern belt is rotated such that the small rolls or plates are in sliding contact with the continuous film to form linear scratches on the film slantingly to the moving direction of the film. The film-pressing means is an endless brush comprising a large number of hairs on an endless belt, which is longer than the width of the film; the endless brush being disposed in parallel with the endless pattern belt via the film. The endless brush is preferably rotated such that the direction of the hairs moving in sliding contact with the film is opposite to the direction of the endless pattern belt moving in sliding contact with the film, whereby the brush hairs are continuously in sliding contact with the film.

In a still further preferred embodiment of the present invention, at least two rolls or plates each having an axial direction in the width direction of the film are arranged in the moving direction of the film, and vertically movable guide means for independently moving the rolls or plates are arranged in the width direction of the film, each roll or plate slidably moving on the film from one end to the other, and being repeatedly subjected to a cycle of moving away from the film after reaching the other end and returning to the original position, during which the movement of the rolls or plates is controlled such that at least any one of rolls or plates is always in sliding contact with the film over its entire width, whereby linear scratches are formed on the film slantingly to its moving direction. The rolls are preferably rotated at a lower peripheral speed than the moving speed of the film in an opposite direction to the moving direction of the film.

In a still further preferred embodiment of the present invention, at least two roll trains each comprising small rolls having a large number of fine hard particles on the surfaces, which are mounted to supports in parallel, are arranged in the width direction of the film; and vertically movable guide means for independently moving the roll trains are arranged in the width direction of the film; each roll train slidably moving on the film from one end to the other, and being repeatedly subjected to a cycle of moving away from the film after reaching the other end and returning to the original position, during which the movement of the roll trains is controlled such that at least any one of the roll trains is always in sliding contact with the film over its entire width, whereby linear scratches are formed on the film slantingly to its moving direction. The axial direction of each small roll in the roll train is preferably substantially in alignment with the longitudinal direction of the film.

In a still further preferred embodiment of the present invention, an endless pattern belt comprising small rolls or plates having a large number of fine hard particles on the surface in parallel, which are longer than the width of the film, is arranged slantingly to its moving direction such that each small roll or plate can be in sliding contact with the film on the film, and the endless pattern belt is rotated in an upstream direction of the film to continuously bring the small rolls or plates into sliding contact with the film, whereby the linear scratches are formed on the film substantially in its width direction. The film-pressing means is an endless brush comprising a large number of hairs on an endless belt, which is longer than the width of the film, the endless brush being arranged in parallel with the endless pattern belt via the film, and the endless brush being rotated such that the direction of the hairs slidably moving on the film is in opposite to the direction of the endless pattern belt slidably moving on the film, thereby continuously bringing the hairs into sliding contact with the film.

In a still further preferred embodiment of the present invention, at least two rolls each having an axial direction slanting to the moving direction of the film, and vertically movable guide means for independently moving the rolls are arranged, each roll slidably moving on the film from one end to the other, and being repeatedly subjected to a cycle of moving away from the film after reaching the other end and returning to the original position, during which the movement of the roll is controlled such that at least any one of the rolls is always in sliding contact with the film over its entire width, whereby the linear scratches are formed on the film substantially in its width direction. Each roll is preferably rotated at a lower peripheral speed than the moving speed of the film in an opposite direction to the moving direction of the film.

In a still further preferred embodiment of the present invention, at least two roll trains each comprising small rolls having a large number of fine hard particles on the surfaces, which are mounted to supports in parallel, are arranged slantingly to the moving direction of the film; and vertically movable guide means for independently moving the roll trains are arranged in the width direction of the film; each roll train slidably moving on the film from one end to the other, and being repeatedly subjected to a cycle of moving away from the film after reaching the other end and returning to the original position, during which the movement of the roll trains is controlled such that at least any one of the roll trains is always in sliding contact with the film over its entire width, whereby the linear scratches are formed on the film substantially in its width direction.

The apparatus for producing an easy-to-straight-tear thermoplastic resin film according to the present invention comprises (a) a means for moving a thermoplastic resin film, (b) a linear-scratch-forming means having a lot of fine projections, which is brought into sliding contact with the film to form substantially parallel linear scratches, and (c) a means for pressing the film from the opposite side of the linear-scratch-forming means in a region in which the film is in sliding contact with the linear-scratch-forming means.

The linear-scratch-forming means is preferably a roll or a plate having a lot of hard fine particles on the surface. The fine particles are preferably particles having a Mohs' hardness of 5 or more, particularly fine diamond particles.

In one preferred embodiment of the present invention, the film-pressing means is an air-blowing means. Preferable as an air-blowing means is a blower or a nozzle. The pressure of an airflow blown onto the film is preferably 0.05 to 5 kgf/cm².

In another preferred embodiment of the present invention, the film-pressing means is a brush brought into sliding contact with the film. The brush preferably has hairs having a recovery-from-bending ratio of 70% or more, a diameter of 0.1 to 1.8 mm, and a length of 1 to 8 cm. The brush hairs are brought into sliding contact with the film at a density of 100 to 500/cm² on the brush-sliding surface. The brush is preferably in sliding contact with the film at a pressure of 0.01 to 5 kgf/cm² on the brush-sliding surface.

The outer diameter of the roll is preferably 2 to 20 cm. A tension of 0.01 to 5 kgf/cm (width) is preferably applied to the film in sliding contact with the linear-scratch-forming means. The moving speed of the film is preferably 10 to 500 m/minute.

In a further preferred embodiment of the present invention, the linear scratches are formed in the film-moving direction by a roll or plate, whose position is fixed with respect to the width direction of the film. It is preferable that the rotation axis of the roll is parallel with the width direction of the film, and that the roll is rotated at a lower peripheral speed than the moving speed of the film in an opposite direction to the moving direction of the film. The peripheral speed of the roll is preferably 1 to 50 m/minute.

In a still further preferred embodiment of the present invention, the linear-scratch-forming means is an endless pattern belt comprising small rolls or plates having a large number of fine hard particles on the surface in parallel, which are longer than the width of the film; each small roll or plate is arranged in the width direction of the film such that it can be in sliding contact with the film; and the endless pattern belt is rotated so that the small rolls or plates are continuously brought into sliding contact with the film, whereby the linear scratches are formed on the film slantingly to its moving direction. The film-pressing means is an endless brush comprising a large number of hairs on an endless belt, which is longer than the width of the film; the endless brush being arranged in parallel with the endless pattern belt via the film; and the endless brush being rotated such that the direction of the hairs slidably moving on the film is opposite to the direction of the small rolls or plates slidably moving on the film, whereby the hairs are continuously in sliding contact with the film.

In a still further preferred embodiment of the present invention, the apparatus comprises at least two rolls or plates each having an axial direction in the width direction of the film, which are arranged in parallel with the moving direction of the film; and vertically movable guide means for independently moving the rolls or plates in the width direction of the film; each roll or plate slidably moving on the film from one end to the other, and being repeatedly subjected to a cycle of moving away from the film after reaching the other end and returning to the original position, during which the movement of the rolls or plates is controlled such that at least any one of rolls or plates is always in sliding contact with the film over its entire width, whereby the linear scratches are formed on the film slantingly to its moving direction. The rolls are preferably rotated at a lower peripheral speed than the moving speed of the film in an opposite direction to the moving direction of the film.

In a still further preferred embodiment of the present invention, the apparatus comprises at least two roll trains in the width direction of the film, each of which comprises small rolls having a large number of fine hard particles on the surface and mounted to supports in parallel; and vertically movable guide means for independently moving the roll trains in the width direction of the film; each roll train slidably moving on the film from one end to the other, and being repeatedly subjected to a cycle of moving away from the film after reaching the other end and returning to the original position, during which the movement of the roll train is controlled such that at least any one of the roll trains is always in sliding contact with the film over its entire width, whereby the linear scratches are formed on the film slantingly to its moving direction. The axial direction of each small roll in the roll train is preferably substantially in alignment with the longitudinal direction of the film.

In a still further preferred embodiment of the present invention, the linear-scratch-forming means is an endless pattern belt comprising small rolls or plates having a large number of fine hard particles on the surface in parallel, which are longer than the width of the film; each small roll or plate being arranged slantingly to the moving direction of the film such that it can be in sliding contact with the film; and the endless pattern belt being rotated in an upstream direction of the film such that the small rolls or plates are continuously in sliding contact with the film, whereby the linear scratches are formed on the film substantially in its width direction. The film-pressing means is preferably an endless brush comprising a large number of hairs on an endless belt, which is longer than the width of the film; the endless brush being arranged in parallel with the endless pattern belt via the film; and the endless brush being rotated such that the direction of the hairs slidably moving on the film is opposite to the direction of the small rolls or plates slidably moving on the film, whereby the hairs are continuously in sliding contact with the film.

In a still further preferred embodiment of the present invention, the apparatus comprises at least two rolls each having an axial direction slanting to the moving direction of the film, and vertically movable guide means for independently moving the rolls, each roll slidably moving on the film from one end to the other, and being repeatedly subjected to a cycle of moving away from the film after reaching the other end and returning to the original position, during which the movement of the roll is controlled such that at least any one of the rolls is always in sliding contact with the film over its entire width, whereby the linear scratches are formed on the film substantially in its width direction. Each roll is preferably rotated at a lower peripheral speed than the moving speed of the film in an opposite direction to the moving direction of the film.

In a still further preferred embodiment of the present invention, the linear-scratch-forming means is at least two roll trains each comprising small rolls having a large number of fine hard particles on the surfaces, which are mounted to supports in parallel; the roll trains being arranged slantingly to the moving direction of the film; the apparatus comprising vertically movable guide means for independently moving the roll trains in the width direction of the film; and each roll train slidably moving on the film from one end to the other, and being repeatedly subjected to a cycle of moving away from the film after reaching the other end and returning to the original position, during which the movement of the roll trains is controlled such that at least any one of the roll trains is always in sliding contact with the film over its entire width, whereby the linear scratches are formed on the film substantially in its width direction.

BRIEF DESCRIPTION OF THE DRAWINGS

FIG. 4(*b*) is a front view and a right side view showing another example of a nozzle;

FIG. 4(*c*) is a schematic view showing the direction of a compressed air blown onto a pattern roll from a nozzle with a hood and the winding of a film around the pattern roll;

FIG. 7(*b*) is a schematic side view taken from the direction (A) in FIG. 7(*a*);

FIG. 10(*b*) is a schematic side view taken from the direction (B) in FIG. 10(*a*);

FIG. 14(*b*) is a schematic side view taken from the direction (C) in FIG. 14(*a*);

DETAILED DESCRIPTION OF THE PREFERRED EMBODIMENTS

[1] Method for Forming Linear Scratches

Figure 1:
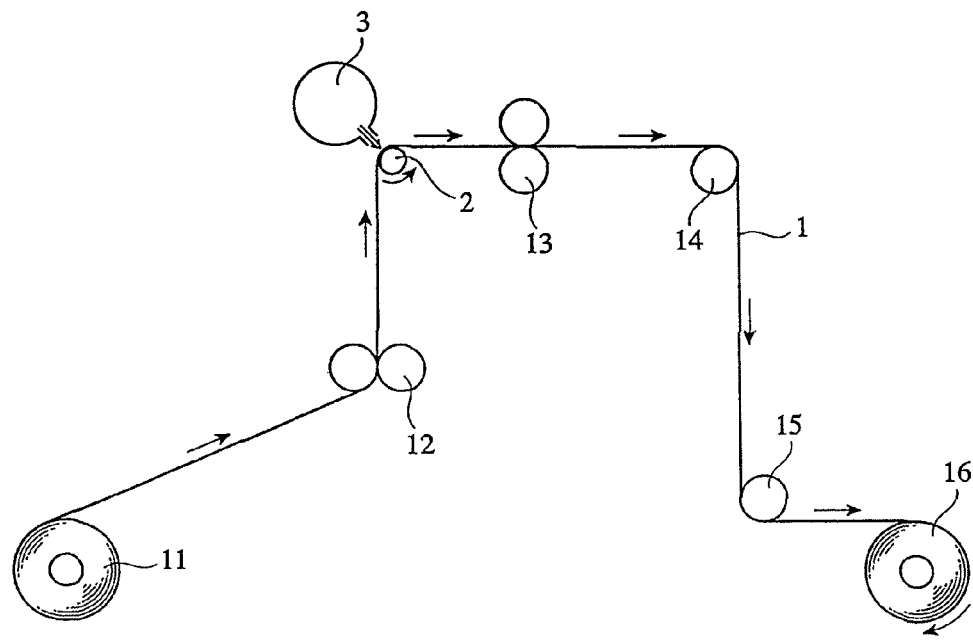
FIG. 1 is a schematic side view showing an example of an apparatus for forming linear scratches on a film in a moving direction thereof.

The easy-to-straight-tear thermoplastic resin film of the present invention is produced by forming substantially parallel linear scratches by bringing a continuously running thermoplastic resin film into sliding contact with a means for forming linear scratches, which has a lot of fine projections. The method and apparatus for producing the easy-to-straight-tear thermoplastic resin film of the present invention will be explained below in detail referring to the drawings.

(1) Formation of Linear Scratches on Film in Moving Direction

FIG. 1 is a schematic side view showing an example of an apparatus for forming linear scratches on a film 1 in a moving direction, which comprises a roll 2 having a lot of fine projections on the surface (hereinafter referred to as "pattern roll") as a means for forming linear scratches, and an air-blowing nozzle 3 as a film-pressing means. A film 1 unwound from a reel 11 having an original film passes between nip rolls 12 and is brought into contact with a pattern roll 2 to be provided with linear scratches. The thermoplastic resin film provided with easy-to-straight-tear characteristics passes through nip rolls 13 and guide rolls 14 and 15, and is then wound around a reel 16.

Figure 2:
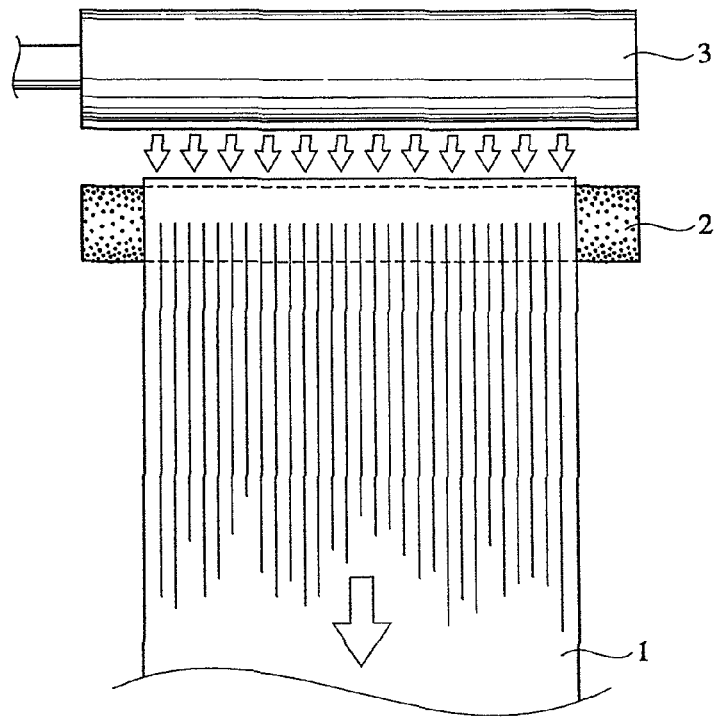
FIG. 2 is a partial, enlarged plan view showing the direction of a compressed air blown onto a film surface in sliding contact with a pattern roll in the apparatus shown in FIG. 1.

As shown in FIG. 2, the pattern roll 2 is fixed with its rotation axis in parallel with the width direction of the film 1, and longer longitudinally than the width of the film 1, such that the film 1 is in sliding contact with the pattern roll over its entire width.

The nip rolls 12 and 13 disposed upstream and downstream of the pattern roll 2 as tension-controlling rolls give tension to the film 1 moving over the pattern roll 2. Further as shown in FIG. 2, the air at a predetermined pressure is blown from a nozzle 3 disposed on the opposite side of the pattern roll 2 onto the film 1 in sliding contact with the pattern roll 2, so that the film 1 is pressed onto the sliding surface (hereinafter referred to as "roll-sliding surface" unless otherwise particularly mentioned) of the pattern roll 2 at a uniform force. Uniform linear scratches are thus formed on the surface of the film. Using the nozzle 3, the film 1 is pressed onto the pattern roll 2, such that non-uniform contact with the roll-sliding surface due to the uneven thickness of the film 1 can be suppressed.

Because the pattern roll 2 has a lower peripheral speed than the moving speed of the film 1, it is preferable to rotate the pattern roll 2 in an opposite direction to the moving direction of the film 1. This can prevent the film from being wrinkled and dust generated by the formation of linear scratches from remaining on the surface of the pattern roll 2, thereby forming linear scratches of proper length and depth. In the present invention, the moving speed of the film 1 is preferably 10 to 500 m/minute. The peripheral speed of the pattern roll 2 (rotation speed in an opposite direction to the moving direction of the film 1) is preferably 1 to 50 mm/minute.

A usable pattern roll 2 is described, for instance, in JP 2002-59487 A. This pattern roll comprises a lot of fine particles having Mohs' hardness of 5 or more attached to a surface of a metal roll by an electrodeposition method or by an organic or inorganic binder. The metal roll is made of iron, iron alloys, etc. The metal roll preferably has a plating layer of nickel or chromium. The fine particles having Mohs' hardness of 5 or more are, for instance, cemented carbide particles such as tungsten carbide, silicon carbide particles, boron carbide particles, sapphire particles, cubic boron nitride (CBN) particles, natural or fine synthetic diamond particles, etc. Fine synthetic diamond particles having large hardness and strength are particularly desirable. The particle size of the fine particles is properly determined depending on the depth and width of linear scratches formed. In the present invention, the fine particles desirably have a particle size of 10 to 100 μm with unevenness of 5% or less. How many fine particles are attached to the roll surface is properly selected such that the formed linear scratches have desired intervals. To form uniform linear scratches, the fine particles are preferably attached to 50% or more of the roll surface. A specific example of the pattern roll 2 may be a pattern roll having a lot of fine synthetic diamond particles fixed with a nickel electrodeposition layer to the surface of an iron roll at an area ratio of 50% or more. The outer diameter of the pattern roll 2 is preferably 2 to 20 cm, more preferably 3 to 10 cm.

The pattern roll 2 may also be a needle roll having metal needles embedded in the surface of a metal roll regularly in a lattice pattern with extremely small intervals. In addition to the pattern roll 2, the means for forming linear scratches may be a pattern plate having many fine particles having Mohs' hardness of 5 or more as described above on the surface of a plate body.

Figure 3:
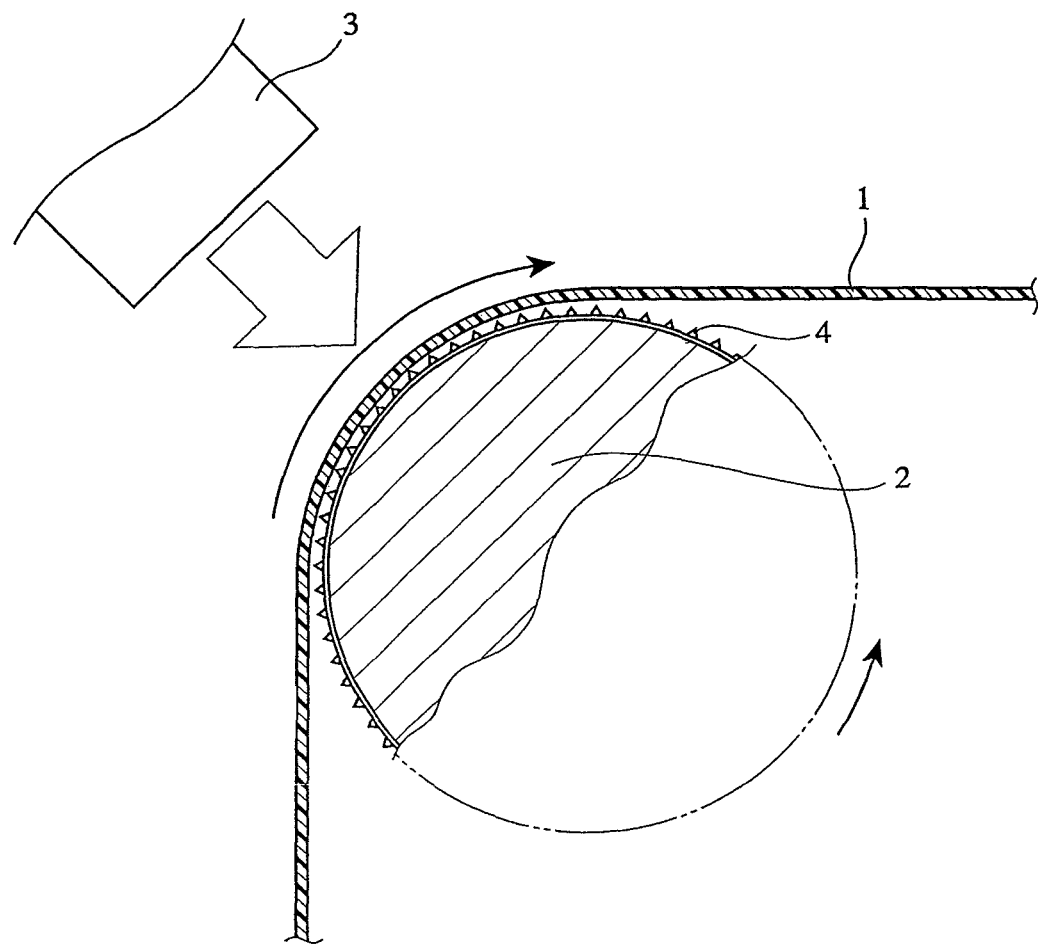
FIG. 3 is a partial, enlarged, cross-sectional view showing a film in sliding contact with a pattern roll in the apparatus shown in FIG. 1.

FIG. 3 is a partial enlarged cross-sectional view showing the film 1 in sliding contact with the pattern roll 2 to form linear scratches. When an edge of at least one fine particle 4 on the surface of the pattern roll 2 bites the roll-sliding surface, one long linear scratch is formed until the edge of the biting fine particle 4 separates away from the roll-sliding surface, because the moving speed of the film 1 is larger than the peripheral speed of the pattern roll 2 rotating in an opposite direction as described above.

Figure 4A:
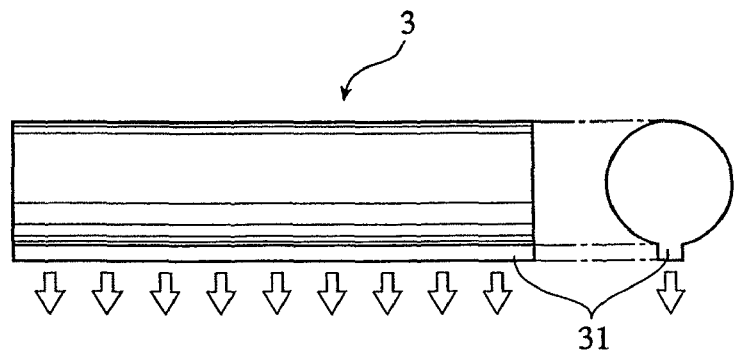
FIG. 4(*a*) is a front view and a right side view showing an example of a nozzle.
Figure 4B:
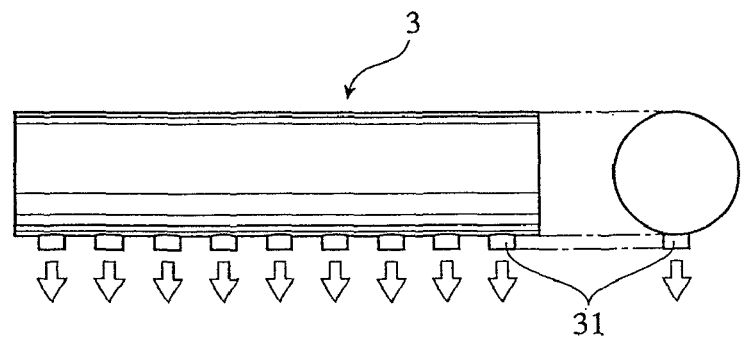
Figure 4C:
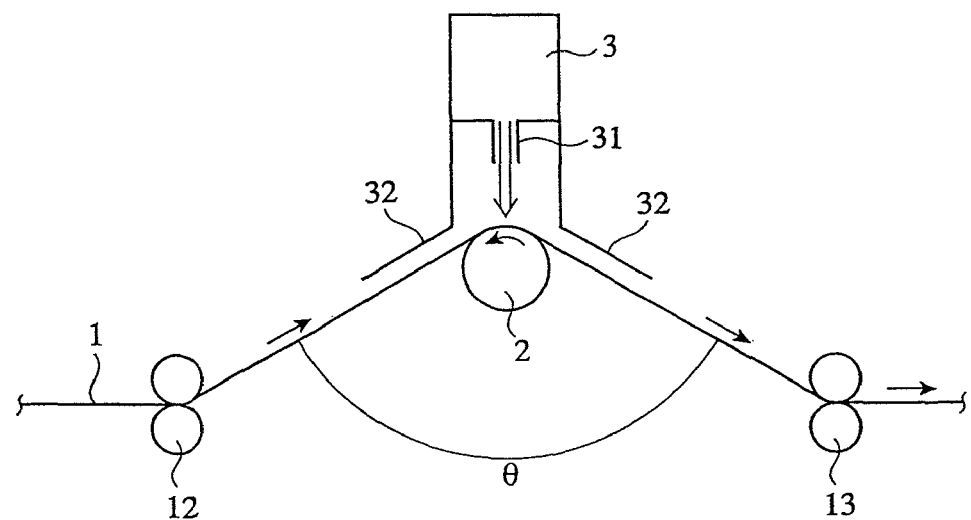

A nozzle having pluralities of blowing orifices 31 shown in FIG. 4(b) may be used as the air-blowing means, in place of a nozzle having a strip-shaped blowing orifice 31 shown in FIG. 4(a), which is the same as shown in FIGS. 1 to 3. In addition, when a compressed air is blown from a nozzle having a hood 32 covering the pattern roll 2 as shown in FIG. 4(c), the compressed air ejected from the blowing orifice 31 is not easily diffused until it reaches a position at which the film 1 is in sliding contact with the pattern roll 2, so that the contact force of the film 1 to the pattern roll 2 becomes further uniform on the roll-sliding surface. The pressure of the compressed air flow blown from such air-blowing means is preferably 0.05 to 5 kgf/cm$^2$, so that the contact force of the film 1 to the pattern roll 2 becomes uniform on the roll-sliding surface. The more preferred pressure of the compressed air flow is 0.1 to 2 kgf/cm$^2$. The distance from the blowing orifice 31 to the roll-sliding surface is preferably 10 to 50 cm. The compressed air needs only uniformly impinge onto a region covering at least a surface of the roll. However, if the blowing orifice 31 of the blower or the nozzle were larger than necessary, too much amount of the compressed air is unpreferably needed to obtain a proper gas pressure.

The winding of the film 1 around the fixed pattern roll 2 is preferably conducted such that an angle θ between the winding direction of the film 1 and the unwinding direction of the film 1 is in a range of 60° to 170° as shown in FIG. 4(c). This makes the length and depth of linear scratches easily adjustable. The angle θ is preferably in a range of 90° to 150°. To set the angle θ at a desired value, the vertical position of the pattern roll 2 may be changed such that the positional relation of the pattern roll 2 to the nip rolls 12 and 13 are properly adjusted. Depending on the way of winding the film 1 around the pattern roll 2 and the outer diameter of the pattern roll 2, a tension given to the film 1 by the nip rolls 12 and 13 and the pressure of a gas ejected from the nozzle 3 may be properly adjusted to obtain linear scratches with the desired length and depth. In the present invention, a tension (tension per width) given to the film by the nip rolls 12 and 13 is preferably in a range of 0.01 to 5 kgf/cm width.

Figure 5:
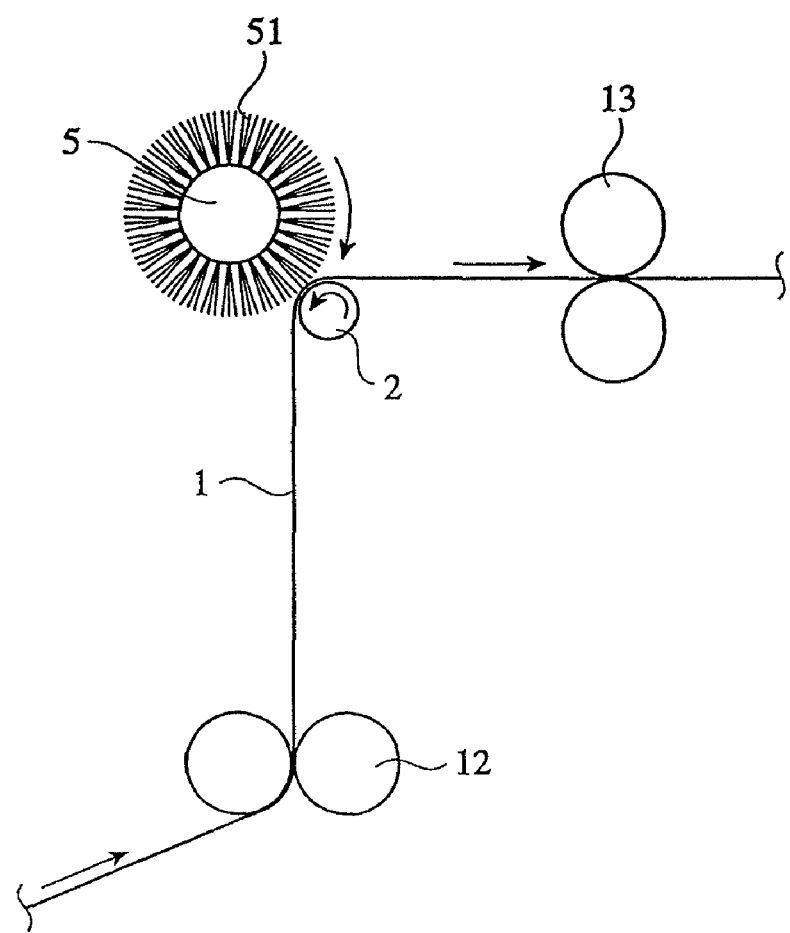
FIG. 5 is a schematic view showing another example of an apparatus for forming linear scratches on a film in a moving direction thereof.

In place of the air-blowing means, a brush may be in sliding contact with the opposite side of the roll-sliding surface, to give a uniform contact force to the roll-sliding surface. The brush hairs are preferably movable on a surface of the film 1, on which the brush slides, (hereinafter referred to as "brush-sliding surface" unless otherwise described), at a lower speed than the moving speed of the film 1 in an opposite direction to the moving direction of the film 1. Thus, as shown in FIG. 5, the brush is preferably a rotatable roll brush 5 having a lot of hairs radially extending from a brush shaft (rotation shaft), which is longer than the width of the film 1 and fixed in parallel with the width direction of the film 1, such that the brush is in sliding contact with the film 1 over its entire width.

The outer diameter of the rotatable roll brush 5 is preferably 5 to 10 cm. The hairs 51 of the rotatable roll brush 5 preferably have a recovery-from-bending ratio of 70% or more, a diameter of 0.1 to 1.8 mm, and a length of 1 to 5 cm. The hairs 51 of the rotatable roll brush 5 preferably have a density of 100 to 500/cm$^2$ on the brush-sliding surface. The recovery-from-bending ratio is determined as follows: First, two looped hair fibers having a length of about 26 cm are crossed like a chain with an upper loop fixed to a hook, and a load (g) as heavy as half of the denier of the hair fiber is applied to a lower loop for 3 minutes, and a sample having a length of about 3 cm is cut out of a pair of loops bent like pine leaves, and left to stand for 60 minutes. An open angle (θ) of the sample is measured to calculate the recovery-from-bending ratio by the equation of (θ/180)×100(%). Though not particularly restrictive, the tip ends of the hairs 51 are preferably substantially in a U-shape or in a tapered shape. The materials of the hairs 51 are preferably synthetic resins such as polypropylene, nylon, acrylic resins, polyethylene, etc., though not particularly restrictive.

The rotatable roll brush 5 is preferably in sliding contact with the film 1 at a pressure of 0.01 to 5 kgf/cm$^2$ on the brush-sliding surface. The peripheral speed of the rotatable roll brush 5 (rotation speed in an opposite direction to the moving direction of the film 1) is preferably 1 to 50 m/minute.

The length and depth of linear scratches are adjusted to obtain the desired level of the easy-to-straight-tear characteristics, by properly changing the moving speed of the film 1, the peripheral speed of the pattern roll 2, the size of the fine diamond particles 4, the outer diameter of the pattern roll, the gas pressure from the nozzle 3, the pressure of the rotatable roll brush 5, a tension given to the nip rolls 12 and 13, etc.

(2) Formation of Slanting Linear Scratches on Film

Figure 6:
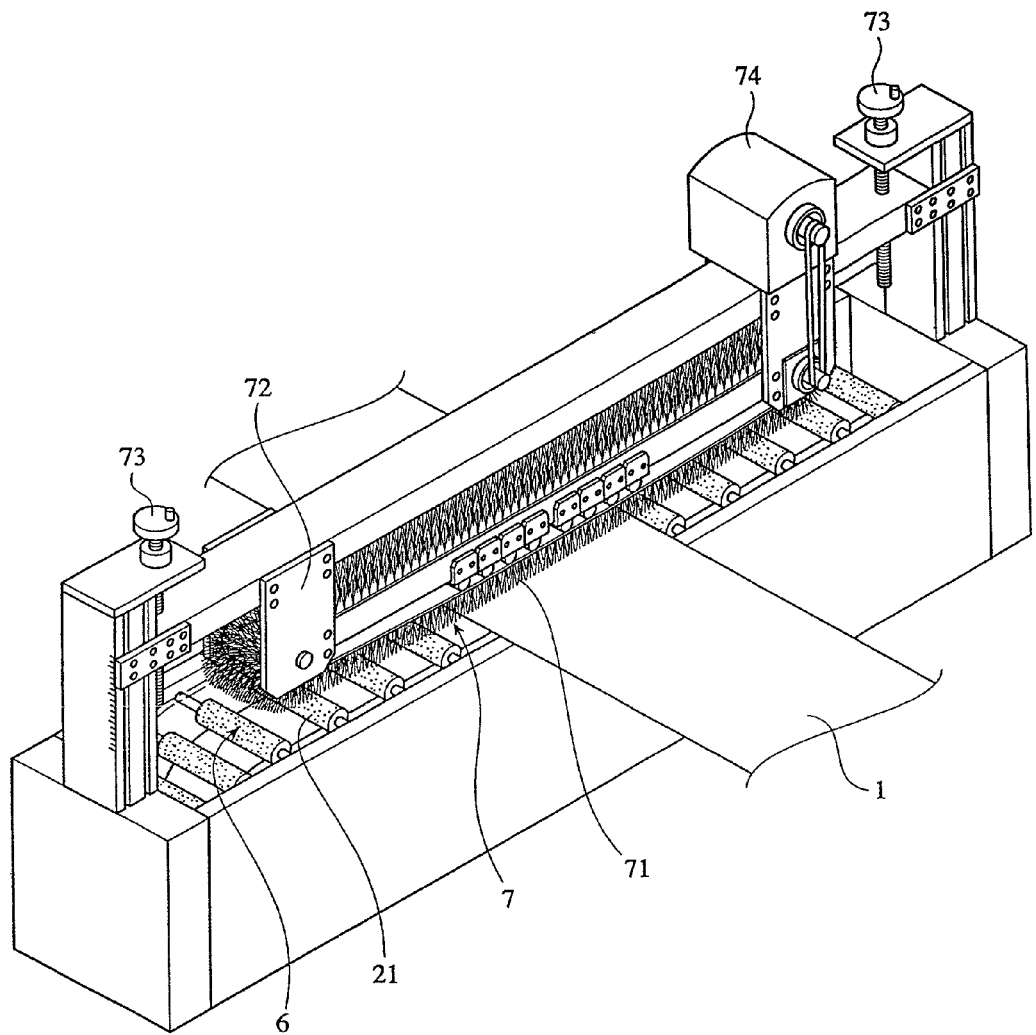
FIG. 6 is a perspective view showing an example of an apparatus for forming linear scratches on a film slantingly to its moving direction.
Figure 7A:
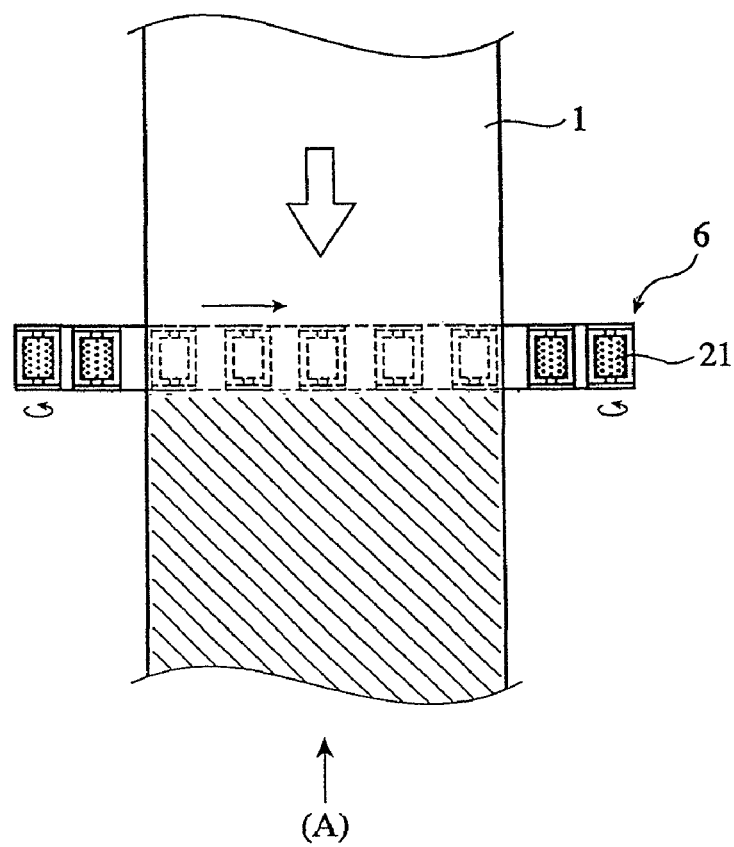
FIG. 7(*a*) is a partial, enlarged plan view showing a film in sliding contact with an endless pattern belt in the apparatus shown in FIG. 6.

FIG. 6 shows an example of an apparatus for forming linear scratches on the film 1 slantingly to the moving direction of the film 1. The same reference numerals are assigned to the same members or portions as in FIG. 1. The apparatus shown in FIG. 6 comprises an endless pattern belt 6 comprising a lot of small pattern rolls 21 connected as a means for forming linear scratches, and an endless brush 7 comprising a lot of hairs 71 implanted to an endless belt as a film-pressing means. FIG. 7(a) is a partial enlarged plan view showing the endless pattern belt 6 rotating in the width direction of the film 1 in the apparatus shown in FIG. 6, and FIG. 7(b) is a schematic cross-sectional view taken from the direction (A) in FIG. 7(a).

Figure 7B:
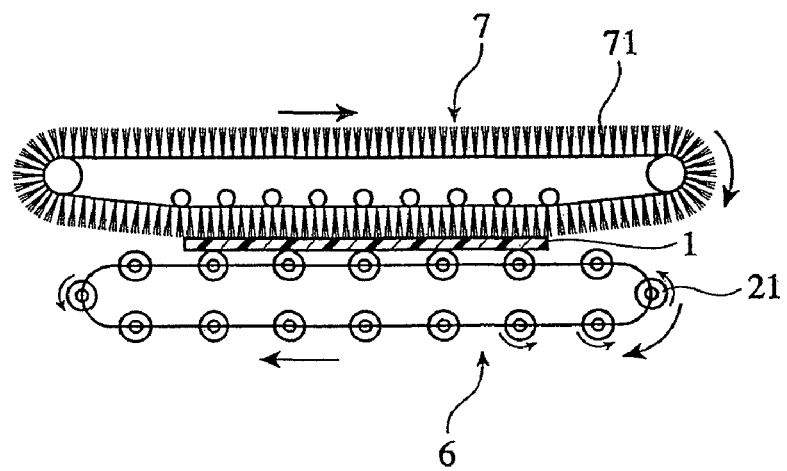

The endless pattern belt 6 is rotated in the width direction of the film 1 as shown in FIGS. 7(a) and 7(b), such that small pattern rolls 21 are in sliding contact with the continuous film 1 to form linear scratches on the film 1 slantingly to its moving direction. The endless pattern belt 6 is preferably constituted by a larger number of the pattern rolls 21 at a high density. The length and outer diameter of each small pattern roll 21 are both preferably 5 to 10 cm.

The angle of the slanting linear scratches to the moving direction of the film can be changed by properly adjusting the peripheral speeds of the endless pattern belt 6 and the moving speed of the film 1. The peripheral speed of the endless pattern belt 6 is usually 1 to 100 n/minute. Small pattern rolls 21 are rotated in an opposite direction to the moving direction of the endless pattern belt 6 on the roll-sliding surface at a peripheral speed of 1 to 50 m/minute as in the case of the pattern roll 2 described in (1) above.

The endless brush 7 is preferably rotated, such that the direction of the hairs 71 moving in sliding contact with the film 1 is opposite to the direction of the endless pattern belt 6 moving in sliding contact with the film 1. Thus, the endless brush 7 and the endless pattern belt 6 are rotated in the same direction. The hairs 71 of the endless brush 7 are preferably as long as 4 to 8 cm. The preferred requirements of the hairs 71 of the endless brush 7 concerning a recovery-from-bending ratio, a diameter, a density on the brush-sliding surface, a tip shape and a material are the same as those of the rotatable roll brush 5 described in (1) above. The pressure of the endless brush 7 on the brush-sliding surface may be 0.01 to 5 kgf/cm$^2$, the same as in the rotatable roll brush 5 described in (1) above. The pressure at which the endless brush 7 comes into sliding contact with the film 1 may be controlled by properly adjusting the vertical position of the endless brush 7 by rotating a height-controlling knob 73. The peripheral speed of the endless brush 7 is preferably 1 to 50 m/minute. The peripheral speed of the endless brush 7 may be controlled by properly adjusting the rotation speed of a motor 74. The endless pattern belt 6 and the endless brush 7 are preferably longer than the width of the film 1 in their moving directions, such that the film 1 is brought into sliding contact with the endless pattern belt 6 and the endless brush 7 over its entire width.

Figure 8:
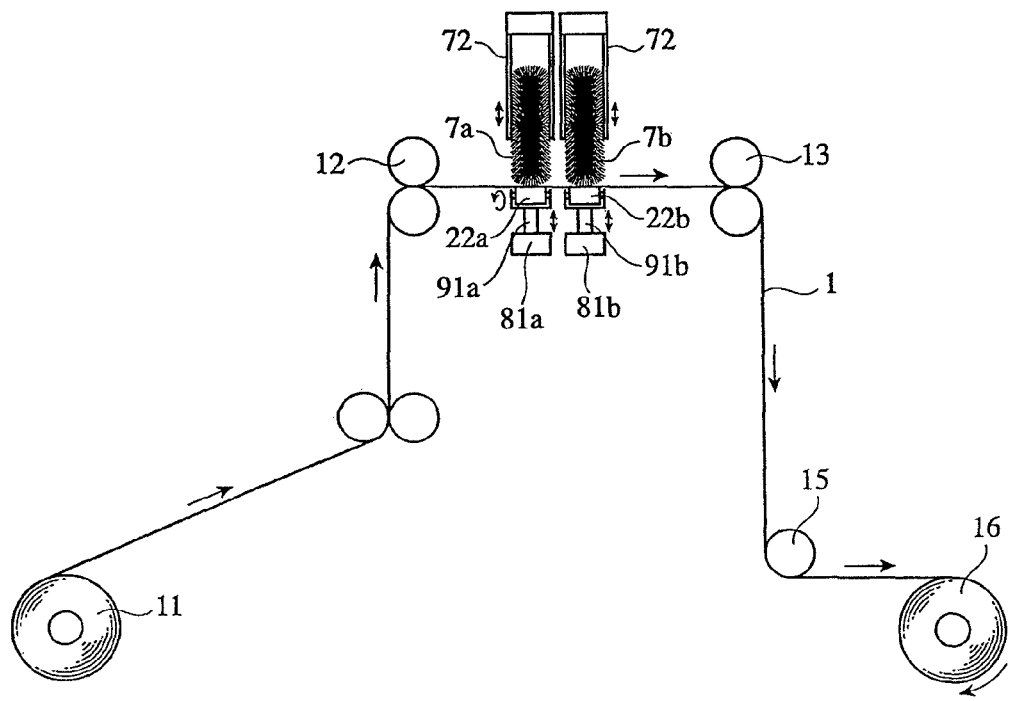
FIG. 8 is a schematic side view showing another example of an apparatus for forming linear scratches on a film slantingly to its moving direction.
Figure 9:
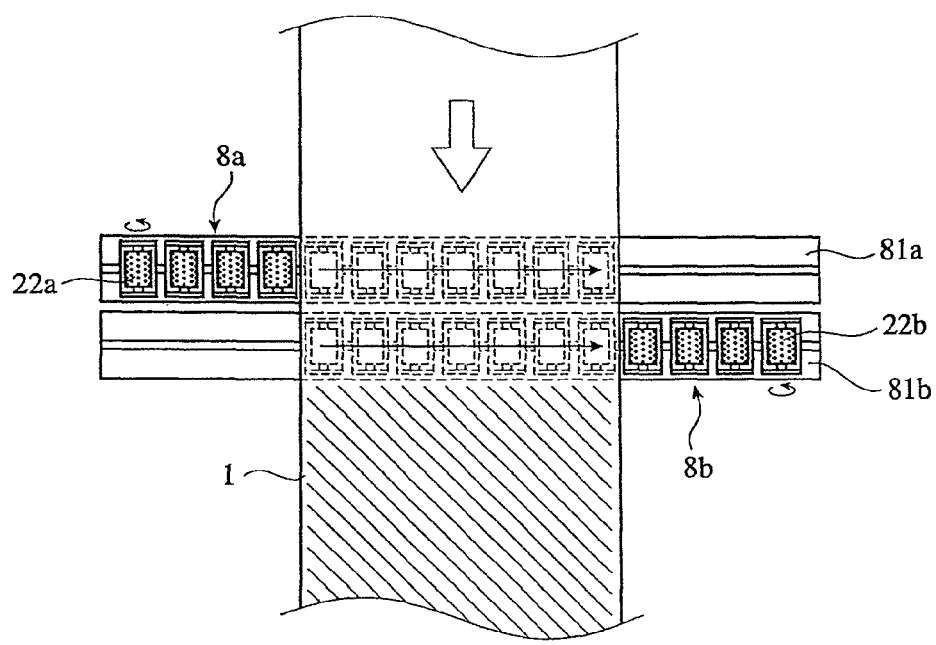
FIG. 9 is a partial enlarged plan view showing a film in sliding contact with a roll train in the apparatus shown in FIG. 8.

FIG. 8 shows another example of an apparatus for providing the film 1 with linear scratches slantingly to the moving direction. The same reference numerals are assigned to the same members or portions as in FIG. 1. The apparatus shown in FIG. 8 comprises a roll train 8a comprising a lot of small pattern rolls 22a mounted to a guide rail (support) 81a in parallel, and a roll train 8b comprising a lot of small pattern rolls 22b mounted to a guide rail (support) 81b in parallel, as means for forming linear scratches, as shown in FIG. 9

Support shafts 91a and 91b supporting the pattern rolls 22a and 22b are movable up and down, and the roll trains 8a and 8b are movable straight along the guide rails 81a and 81b, respectively, in the width direction of the film 1. The guide means comprising the support shafts 91a and 91b movable up and down and the guide rails 81a and 81b can independently move the roll trains 8a and 8b in the width direction of the film 1. Accordingly, the roll trains 8a and 8b move from one end of the film 1 to the other end thereof in a slidably contacting manner, and then separate from the film 1 and return to the original position, and this cycle is repeated. During this cycle, the movement of the roll trains 8a and 8b is controlled such that at least any one of the roll trains is always in sliding contact with the film 1 over its entire width, thereby forming linear scratches on the film slantingly to its moving direction. As the guide means, instead of making the support shafts 91a and 91b not movable up and down relative to the guide rails 81a and 81b, the guide rails 81a and 81b may move up and down.

The longitudinal length and outer diameter of each pattern roll 22a, 22b may be about 5 to 10 cm. Intervals between the adjacent pattern rolls 22a, 22b are preferably narrower than the width of each pattern roll, such that the pattern rolls are disposed at a high density. Each roll train 8a, 8b is longer than the width of the film 1.

The apparatus shown in FIG. 8 comprises the same endless brushes 7a and 7b as in the apparatus shown in FIG. 6 as film-pressing means, and the endless brushes 7a and 7b are opposing to the roll trains 8a and 8b in parallel via the film 1. Support members 72, 72 supporting the endless brushes 7a and 7b are movable up and down. Accordingly, the vertical movement of the endless brush 7a is controlled such that both the endless brush 7a and the roll train 8a are brought into sliding contact with the film 1 simultaneously, and the vertical movement of the endless brush 7b is controlled such that both the endless brush 7b and the roll train 8b are brought into sliding contact with the film 1 simultaneously. Thus, a constant contact force is always applied to the roll-sliding surface.

The endless brushes 7a and 7b are preferably rotated such that the moving direction of their hairs in sliding contact with the film 1 is opposite to the moving direction of the roll trains 8a and 8b in sliding contact with the film 1. The preferred requirements of the hairs of the endless brushes 7a and 7b concerning a recovery-from-bending ratio, a diameter, a length, a density on the brush-sliding surface, a tip shape and a material, and the preferred requirements of the endless brushes 7a and 7b concerning a pressure onto the brush-sliding surface and a peripheral speed may be the same as those of the endless brush 7 in the apparatus shown in FIG. 6.

The angle of the slanting linear scratches to the moving direction of the film may be changed by properly adjusting the speed of the roll trains 8a and 8b in sliding contact with the film 1 and the moving speed of the film 1. The pattern rolls 22a and 22b are rotated in an opposite direction to the moving direction of the roll trains 8a and 8b on the roll-sliding surface. Their peripheral speed may be the same as that of the pattern rolls 2 described in (1) above.

Figure 10A:
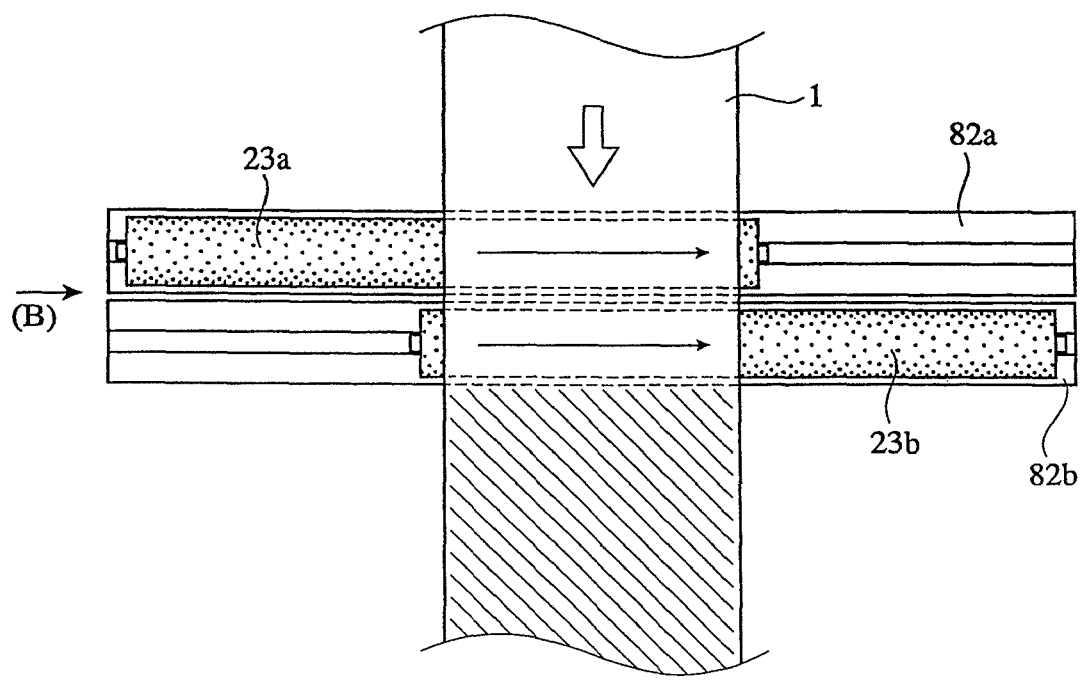
FIG. 10(*a*) is a partial enlarged plan view showing a further example of an apparatus for forming linear scratches on a film slantingly to its moving direction.
Figure 10B:
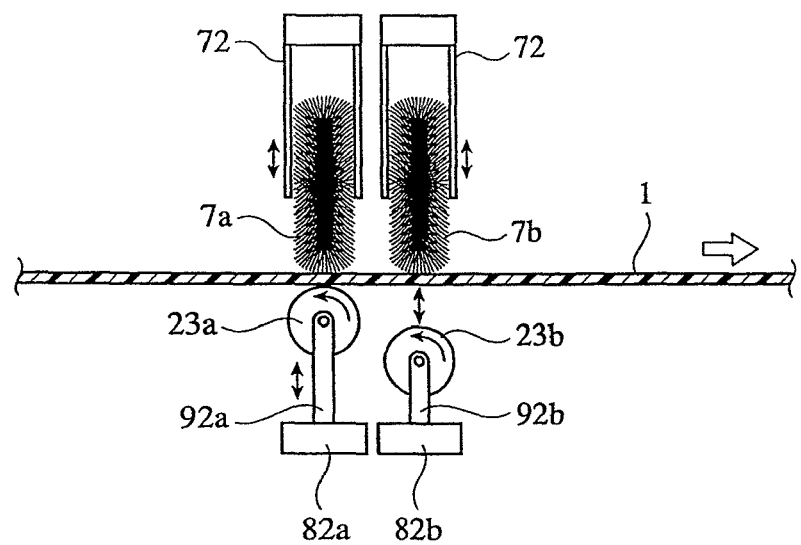

FIGS. 10(a) and 10(b) show another example of an apparatus for forming linear scratches slantingly to the moving direction of the film 1. In this embodiment, two pattern rolls 23a and 23b each having a larger longitudinal length than the width of the film 1 are disposed in parallel in two rows in the moving direction of the film 1. The longitudinal length of each pattern roll 23a and 23b is preferably 2 times the width of the film 1 or more.

Support shafts 92a and 92b supporting the pattern rolls 23a and 23b are movable up and down, and the pattern rolls 23a and 23b are movable straight along guide rails 82a and 82b in the width direction of the film 1. The pattern rolls 23a and 23b can move independently in the width direction of the film 1 by a guide means comprising the vertically movable 92a and 92b and the guide rails 82a and 82b. Accordingly, the pattern rolls 23a and 23b move from one end of the film 1 to the other end thereof in a slidably contacting manner, and then separate from the film 1 and return to the original position, and this cycle is repeated. During the cycle, the movement of the pattern rolls 23a and 23b can be controlled such that at least any one of the pattern rolls is always in sliding contact with the film 1 over its entire width, thereby forming linear scratches slanting to the moving direction of the film. The angle of the slanting linear scratches to the moving direction of the film can be changed by properly adjusting the sliding speed of the pattern rolls 23a and 23b and the moving speed of the film 1.

The apparatus shown in FIG. 10 comprises, as film-pressing means, endless brushes 7a and 7b movable up and down and opposing the pattern rolls 23a and 23b in parallel via the film 1 like the apparatus shown in FIG. 8.

Though the apparatuses shown in FIGS. 6 to 10 comprise the endless brushes as film-pressing means, they may comprise the air-blowing means described in (1) above.

(3) Formation of Linear Scratches on Film in Width Direction

Figure 11:
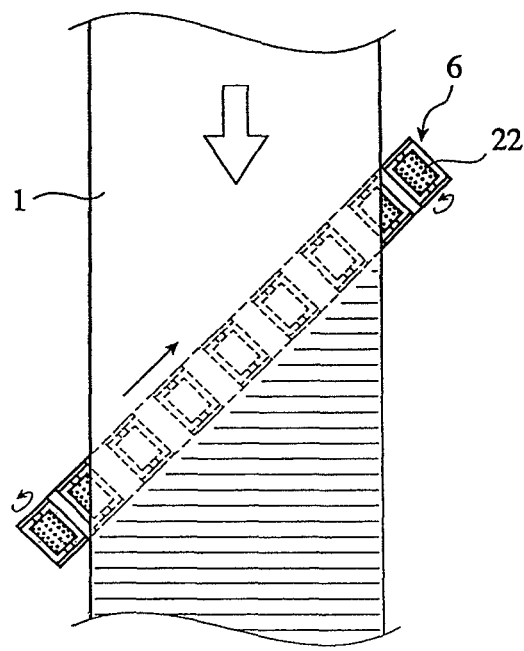
FIG. 11 is a partial, enlarged plan view showing an example of an apparatus for forming linear scratches on a film perpendicularly to a moving direction thereof.

FIG. 11 shows an example of an apparatus for forming linear scratches on a film 1 in its width direction. The same reference numerals are assigned to the same members or portions as in FIG. 6. The apparatus shown in FIG. 11 is the same as shown in FIGS. 6 and 7 except that an endless pattern belt 6 is disposed slantingly to the moving direction of a film (no endless brush shown). Using the apparatus having the structure shown in FIG. 11, linear scratches can be formed on the film 1 in its width direction, by properly adjusting operation conditions such as the moving speed of the film 1, the angle of the endless pattern belt 6 to moving direction of the film 1, the peripheral speed of the pattern belt 6, etc.

Figure 12:
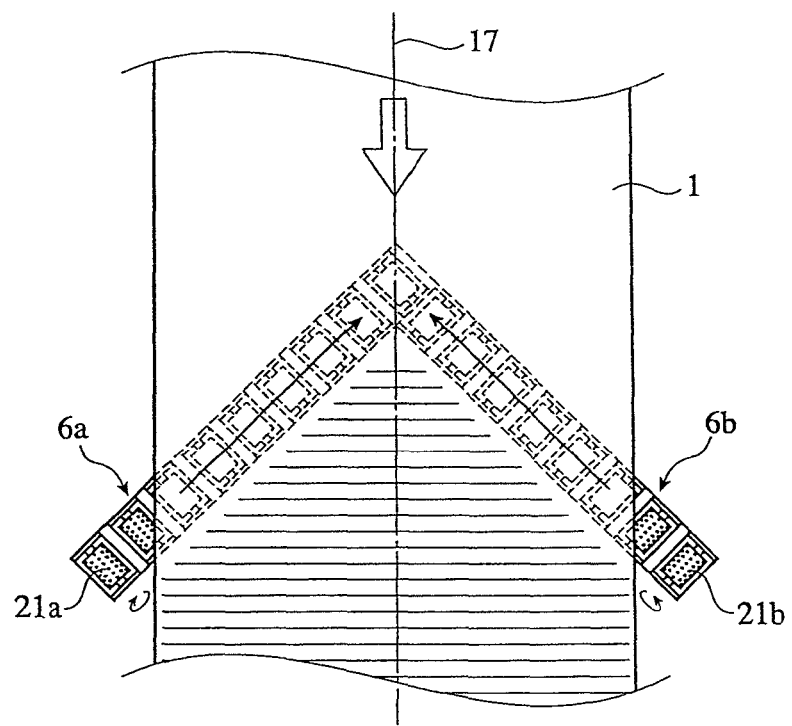
FIG. 12 is a partial, enlarged plan view showing another example of an apparatus for forming linear scratches on a film perpendicularly to a moving direction thereof.

FIG. 12 shows another example of an apparatus for forming linear scratches on the film 1 in a width direction. In this embodiment, an endless pattern belt 6a comprising a lot of small pattern rolls 21a and an endless pattern belt 6b comprising a lot of small pattern rolls 21b are disposed symmetrically to the center line 17 of the film 1 as a symmetry axis and slanting to the moving direction of the film. The same endless brushes (not shown) as in the apparatus shown in FIG. 6 are preferably disposed as film-pressing means in parallel with endless pattern belts 6a and 6b via a film 1.

Using the apparatus having the structure shown in FIG. 12, linear scratches can be formed on the film 1 in its width direction, by properly adjusting operation conditions such as the moving speed of the film 1, the angles of the endless pattern belts 6a and 6b to the center fine 17 of the film 1, the peripheral speeds of the endless pattern belts 6a and 6b, etc.

Figure 13:
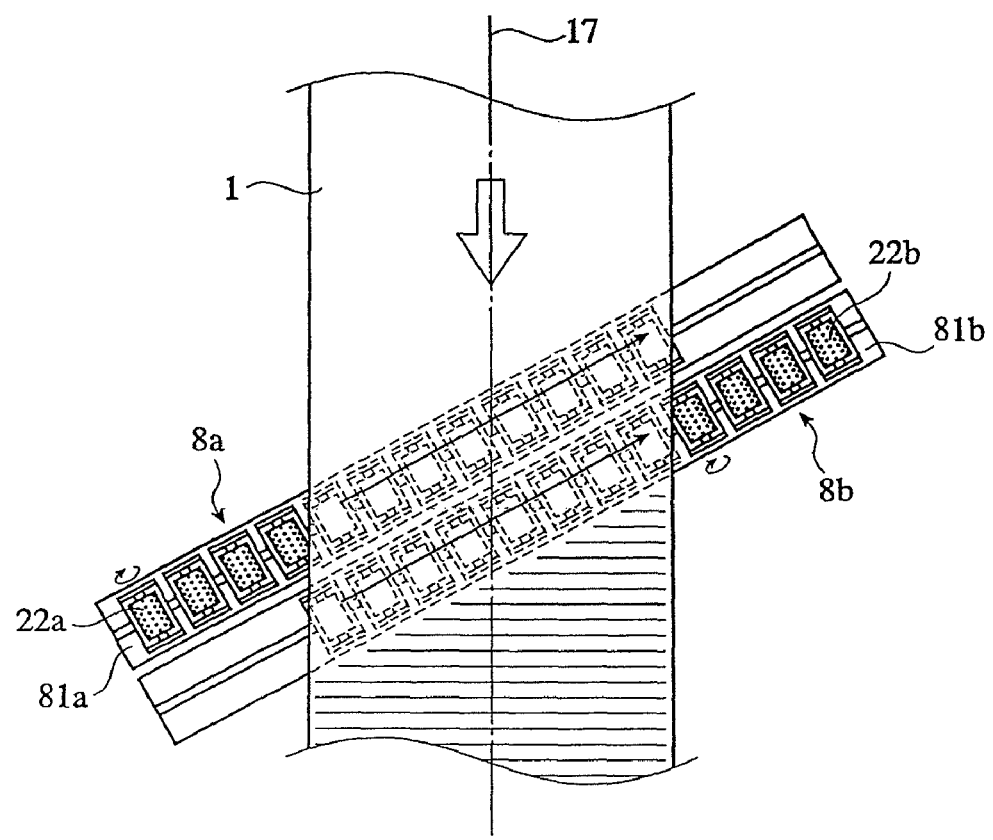
FIG. 13 is a partial, enlarged plan view showing a further example of an apparatus for forming linear scratches on a film perpendicularly to a moving direction thereof.

FIG. 13 shows another example of an apparatus for forming linear scratches on the film 1 in its width direction. The apparatus shown in FIG. 13 is the same as shown in FIG. 9, except that the same roll trains 8a and 8b as shown in FIG. 9 are disposed slantingly to the width direction of the film 1 (no endless brushes shown). Using the apparatus having the structure shown in FIG. 13, linear scratches can be formed on the film 1 in its width direction, by properly adjusting operation conditions such as the moving speed of the film 1, the angles of the roll trains 8a and 8b relative to the moving direction of the film 1, the sliding speeds of the roll trains 8a and 8b, etc.

Figure 14A:
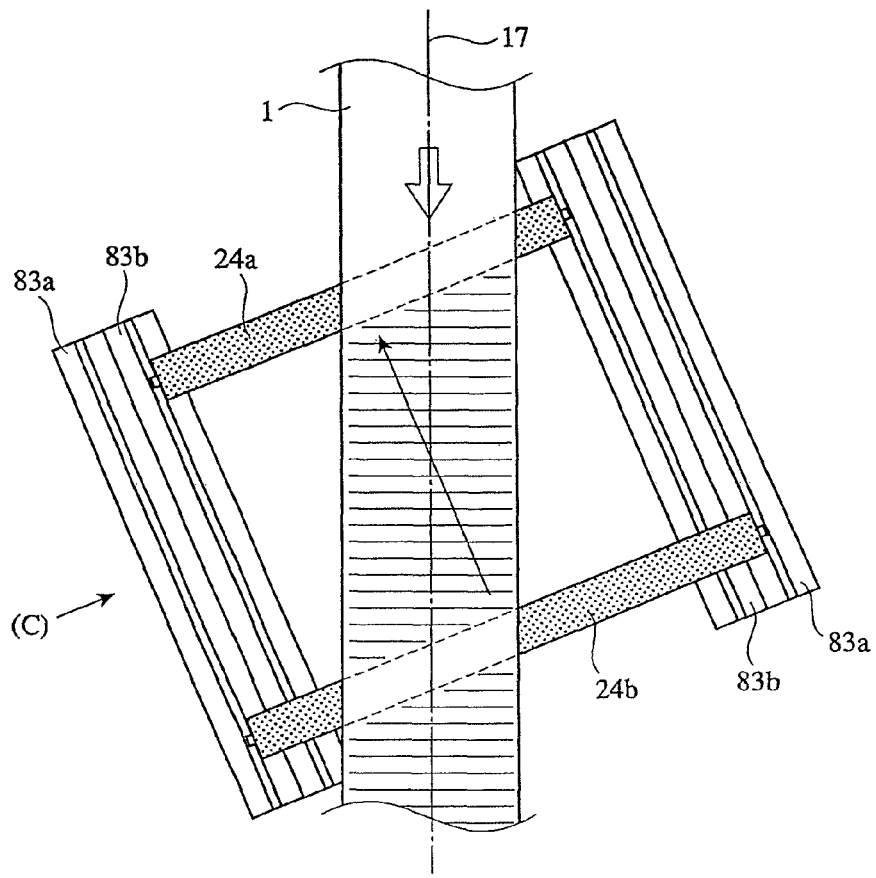
FIG. 14(*a*) is a partial, enlarged plan view showing a still further example of an apparatus for forming linear scratches on a film perpendicularly to a moving direction thereof.
Figure 14B:
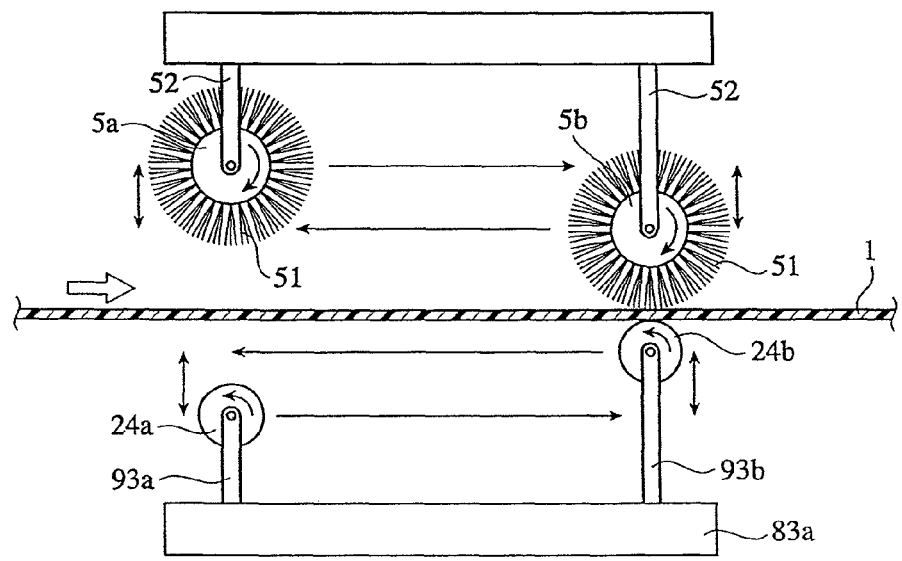

FIGS. 14(*a*) and 14(*b*) show another example of an apparatus for forming linear scratches on the film 1 in a width direction. FIG. 14(*b*) shows a left side of the apparatus shown in FIG. 14(*a*) [taken from the direction (C) in FIG. 14(*a*)]. The apparatus in this embodiment comprises two pattern rolls 24a and 24b each having a longitudinal axis slanting to the moving direction of the film 1. The longitudinal length of each pattern roll 24a and 24b is preferably at least two times the width of the film 1 or more.

Support shafts 93a and 93b supporting the pattern rolls 24a and 24b are movable up and down, and the pattern rolls 24a and 24b are movable straight along guide rails 83a and 83b at a predetermined angle relative to the center line 17 of the film 1. The pattern rolls 24a and 24b can move independently at a predetermined angle relative to the center line 17 of the film 1, by a guide means comprising the vertically movable 93a and 93b and the guide rails 83a and 83b. Because the pattern roll 24b is longer than the pattern roll 24a, the pattern rolls 24a and 24b can cross each other during moving in opposite directions. The pattern rolls 24a and 24b thus move from one end of the film 1 to the other end thereof in a slidably contacting manner, and separate from the film 1 and return to the original position, and this cycle is repeated. Linear scratches can be formed on the film in its width direction, by controlling the movement of the pattern rolls 24a and 24b such that at least any one of the pattern rolls is always in sliding contact with the film 1 over its entire width.

As shown in FIG. 14(*b*), rotatable roll brushes 5a and 5b are movable up and down in parallel, and move as the pattern rolls 83a and 83b move along the roll-sliding surface of the film 1. One of the rotatable roll brushes 5a and 5b is longer than the other in a longitudinal direction, so that they can cross each other during moving in opposite directions. A contact force is thus always applied to the film 1 in sliding contact with the pattern roll 83a or 83b. The preferred requirements of the hairs 51 of the rotatable roll brushes 5a and 5b concerning a recovery-from-bending ratio, a diameter, a length, a density on the brush-sliding surface, a tip shape and a material may be the same as those of the rotatable roll brush 5 described in (1) above.

In the apparatuses shown in FIGS. 11 to 14, linear scratches can be formed on the film 1 slantingly to its moving direction, by properly adjusting operation conditions, etc. Though the apparatuses shown in FIGS. 11 to 14 comprise the endless brushes as film-pressing means, they may comprise the air-blowing means described in (1) above.

[2] Thermoplastic Resin Film

Though not particularly limited, examples of thermoplastic resin films usable for producing the easy-to-straight-tear thermoplastic resin film of the present invention include single-layer films made of polyolefins such as polyethylene and polypropylene; polyesters such as polyethylene terephthalate, polybutylene terephthalate and polyethylene naphthalate; polyvinyl chlorides; fluororesins; polyamides; polycarbonate; polyimides; polyetheretherketone; polyetherketone; elastomers; polyurethanes; polyethersulfone; polyphenylene sulfide; polyamideimides, etc. The thermoplastic resin films may be stretched monoaxially or biaxially, if necessary.

The above thermoplastic resin film may be vapor-deposited with metals, metal oxides, etc. or coated with resins to provide vapor-deposited transparent films. Specific examples thereof include silica-deposited polyethylene terephthalate films, alumina-deposited polyethylene terephthalate films, etc.

The above thermoplastic resin film may comprise a layer of common polyolefins and a sealant layer of special polyolefins. Specifically, they are low-density polyethylene (LDPE), medium-density polyethylene (MDPE), high-density polyethylene (HDPE), cast polypropylene (CPP), linear-low-density polyethylene (LLDPE), very-low-density polyethylene (VLDPE), ethylene-vinyl acetate copolymers (EVAs), ethylene-acrylic acid copolymers (EAAs), ethylene-methacrylic acid copolymers (EMAAs), ethylene-ethyl acrylate copolymers (EEAs), ethylene-methylmethacrylate copolymers (EMMAs), ethylene-methyl acrylate copolymers (EMAs), ionomers (IOs), etc. To further improve moisture resistance and gas barrier, the thermoplastic resin film preferably comprises an intermediate layer formed by an aluminum foil, a silica-deposited polyethylene terephthalate film, an alumina-deposited polyethylene terephthalate film, etc.

In the production of a laminate film, the above thermoplastic resin film or vapor-deposited transparent film is preferably formed with linear scratches described in [1] above, and then laminated with a sealant film with or without the above intermediate film. The lamination may be carried out by a known method, for instance, by extrusion with an adhesive layer therebetween. The adhesive layer is preferably made of polyethylene.

The thermoplastic resin film may be a film having a lot of fine pores, which is called "porous film." Fine pores are preferably formed before forming the linear scratches described above. The fine pores may be penetrating or non-penetrating the thermoplastic resin film. The fine pores preferably have an average opening diameter of 0.5 to 100 μm, and they exist at a density of about 500/cm$^2$ or more. The upper limit of the density of the fine pores is not particularity restricted as long as technically possible. In the production of the laminate film, the sealant film may be formed with a lot of fine pores described above, if necessary, to improve the easy-to-tear characteristics of the laminate film.

To form the fine pores on the thermoplastic resin film, the methods disclosed in Japanese Patent 2,063,411 and JP 2002-059487 A, for instance, may be used. In the method for producing a long porous sealant film disclosed in Japanese Patent 2,063,411, a long sealant film is caused to pass between a first roll having fine particles with sharp edges and a Mohs' hardness of 5 or more on the surface (the same as the pattern roll 2 described in [1] (1) above), and a second roll having a smooth surface, with pressure applied to the film passing therebetween adjusted uniform over its entire width in contact with the roll, to form a lot of penetrating or non-penetrating pores having a diameter of 50 μm or less at a density of 500/cm$^2$ or more on the long sealant film with sharp edges of a lot of particles on the first roll surface.

[3] Easy-to-Straight-Tearing Thermoplastic Resin Film

Because the easy-to-straight-tear thermoplastic resin film of the present invention has a lot of substantially parallel linear scratches at least on one surface, it can be easily torn straight from any point along the linear scratches. It thus has easy-to-straight-tear characteristics in one direction regardless of the orientation of the original film. A wrapping bag formed from the easy-to-straight-tear thermoplastic resin film of the present invention can be opened in a strip shape without tapering while keeping a constant width.

The depth of linear scratches on the easy-to-straight-tear thermoplastic resin film is preferably 1 to 40% of the film thickness, to meet both requirements of high strength and good easy-to-straight-tear characteristics. The linear scratches formed by the method described in [1] above are preferably as deep as 0.1 to 10 μm and as wide as 0.1 to 10 μm, and their intervals are preferably 10 to 200 μg/m.

Figure 15:
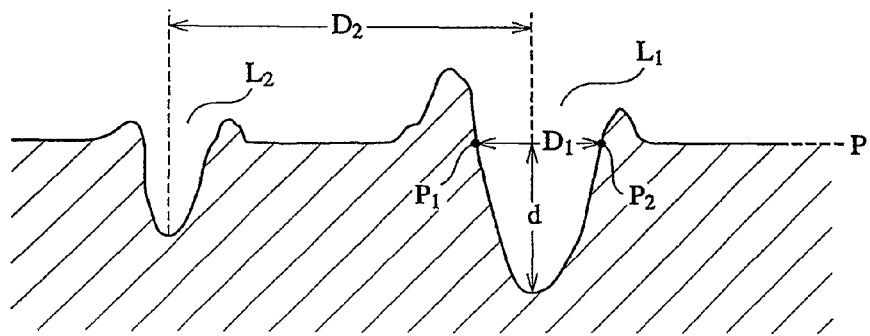
FIG. 15 is a view showing a model of measuring the surface roughness of the easy-to-straight-tear thermoplastic resin film of the present invention by an AFM.

The method for measuring the depth, width and intervals of the linear scratches will be explained below referring to the drawings. FIG. 15 schematically illustrates the cross section of the easy-to-straight-tear thermoplastic resin film of the present invention rectangularly to the linear scratches, which is taken from an image of surface roughness measured by an atomic force microscope (AFM). The depth of a linear scratch $L_1$ is a distance d between a reference line P and the bottom of the linear scratch $L_1$. The width of the linear scratch is a distance $D_1$ between intersections $P_1$ and $P_2$, at which the reference line P crosses the walls of the linear scratch. The interval of linear scratches is a distance $D_2$ between the bottoms of parallel linear scratches $L_1$ and $L_2$.

The film having linear scratches in its moving direction (longitudinal direction) may be used for wrapping bags for stick cookies. Because the wrapping bags formed by the easy-to-straight-tear thermoplastic resin film of the present invention having linear scratches in a longitudinal direction can be opened in a strip shape without tapering while keeping a constant width, the cookies are not damaged. Though wrappings formed by a biaxially stretched polypropylene films (OPP films) for rice balls, etc. are provided with cutting tapes (tear tapes) in alignment with the opening width, the easy-to-straight-tear thermoplastic resin film of the present invention having linear scratches in a longitudinal direction does not need a tear tape, because it can be opened while keeping the opening width.

The film having linear scratches slanting to its moving direction may be used for wrapping bags of powdery medicine, seasonings for lunch boxes, etc. A wrapping bag formed by the easy-to-straight-tear thermoplastic resin film of the present invention having slanting linear scratches can be easily torn slantingly in a corner thereof.

The film having linear scratches in a width direction (transverse direction) may be used for stick-shaped wrapping bags of powdery instant food, etc. Using the easy-to-straight-tear thermoplastic resin film of the present invention having linear scratches in a transverse direction, increasingly demanded stick-shaped wrapping bags can be produced at a low cost.

The present invention will be explained in more detail referring to Examples below without intention of restricting the present invention thereto.

Example 1

A polyester (PET) film having a thickness of 12 μm was brought into sliding contact with a 5-cm-diameter pattern roll with fine synthetic diamond particles having a diameter of 100 μm to produce an easy-to-straight-tear polyester film having linear scratches in its moving direction, under the conditions that the film speed was 50 m/minute, that the peripheral speed of the pattern roll rotating in an opposing direction to the film was 10 m/minute, that the pressure of air blown from a nozzle was 1 kgf/cm$^2$, and that a tension given to the film by nip rolls was 0.5 kgf/cm width.

Figure 16:
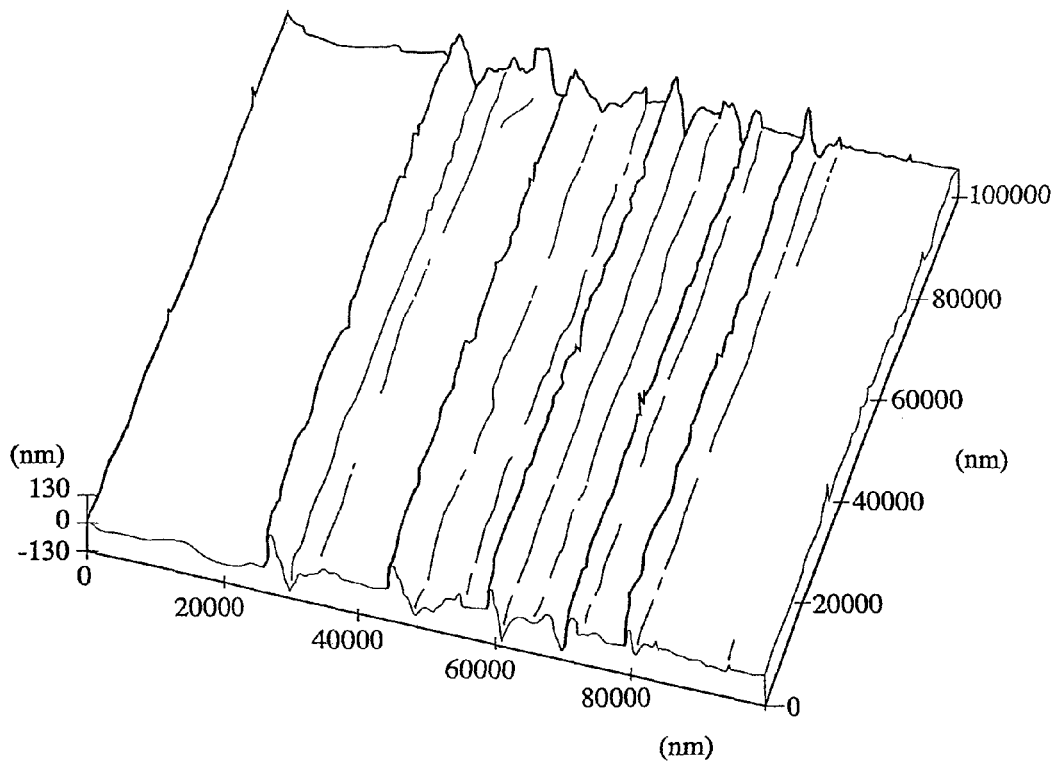
FIG. 16 is a graph illustrating an AFM image of the easy-to-straight-tear polyester film in Example 1.
Figure 17:
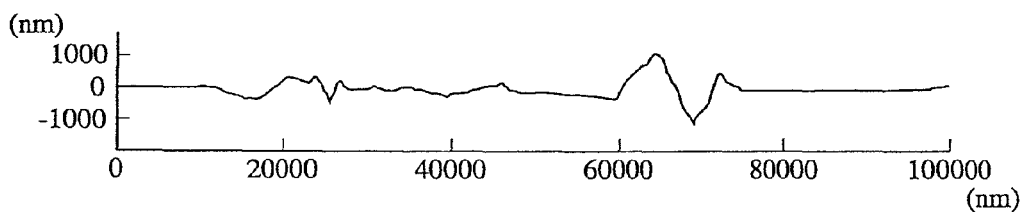
FIG. 17 is a graph illustrating one cross section of the AFM image of the easy-to-straight-tear polyester film in Example 1.

A surface of the resultant easy-to-straight-tear polyester film was observed by AFM. FIGS. 16 and 17 are the drawings of AFM images. FIGS. 16 and 17 show different portions of the film, and FIG. 17 shows a cross section of the observed portion. As is clear from FIGS. 16 and 17, linear scratches of 0.1 to 1 μm in depth, 0.5 to 5 μm in width and 10 to 50 μm in interval were formed on the polyester film. It is clear that because the linear scratches were formed by scraping by fine synthetic diamond particles, film portions on both sides of the grooves were plastically deformed to bulge by pressure when the linear scratches (grooves) were formed.

It was confirmed that the resultant easy-to-straight-tear polyester film was torn straight at least in a longitudinal length of an A4 size or so.

Because the easy-to-straight-tear thermoplastic resin film of the present invention can be easily torn straight in one direction regardless of the orientation of the original film as described above, it is useful for wrapping bags requiring various types of easy opening. With the method and apparatus for producing the easy-to-straight-tear thermoplastic resin film of the present invention, it is possible to produce such easy-to-straight-tear thermoplastic resin films at a low cost.

What is claimed is:

1. A method for producing a straight-tearable thermoplastic resin film uniformly having parallel, linear scratches formed in a longitudinal direction on its entire surface, comprising bringing a thermoplastic resin film into sliding contact with a peripheral surface of a pattern roll having a multiplicity of hard fine particles with sharp edges over its entire surface, said film being wound around said pattern roll such that an angle θ between a winding direction of said film and an unwinding direction of said film is in a range of 60° to 170°, and pressing said film onto said pattern roll wherein said pattern roll is rotated at a lower peripheral speed than the moving speed of said film in an opposite direction to the moving direction of said film.

2. The method for producing a straight-tearable thermoplastic resin film according to claim 1, wherein said film is pressed onto said pattern roll by an air-blowing means or a rotating brush.

3. The method for producing a straight-tearable thermoplastic resin film according to claim 1, wherein an endless pattern belt comprising small pattern rolls each having a large number of hard fine particles on the surface in parallel is arranged in the width direction of said film, such that said endless pattern belt transversely covers said film; and wherein said endless pattern belt is rotated to continuously bring said small pattern rolls into sliding contact with said film moving longitudinally, whereby said linear scratches are formed on said film slantingly to its moving direction.

4. The method for producing a straight-tearable thermoplastic resin film according to claim 3, wherein an endless brush comprising a large number of hairs on an endless belt is disposed on said endless pattern belt via said film, and wherein said endless brush is rotated to continuously bring said hairs into sliding contact with said film, such that said hairs press said film to said small pattern rolls of said endless pattern.

5. The method of producing a straight-tearable thermoplastic resin film according to claim 1, wherein at least two parallel pattern rolls each having an axial direction in the width direction of said film are arranged in the width direction of said film; wherein vertically movable guide means for independently moving said two parallel pattern rolls in the width direction of said film are provided; wherein each pattern roll is slidably movable on said film from one end to the other; wherein said pattern rolls are repeatedly subjected to a cycle of moving away from said film after reaching the other end and returning to the original position; and wherein the movement of said pattern rolls is controlled such that at least any one of said pattern rolls is always in sliding contact with said film over its entire width, whereby said linear scratches are formed on said film slantingly to its moving direction.

6. The method for producing a straight-tearable thermoplastic resin film according to claim 1, wherein at least two parallel roll trains each comprising small pattern rolls having a large number of fine hard particles on the surface are arranged in the width direction of said film, the axial direction of each small pattern roll being in alignment with the moving direction of said film, said roll trains independently moving along vertically movable guide means in the width direction of said film; wherein each roll train slidably moves on said film from one end to the other, and is repeatedly subjected to a cycle of moving away from said film after reaching the other end and returning to the original position, during which the movement of said roll trains is controlled such that at least any one of said roll trains is always in sliding contact with said film over its entire width, whereby said linear scratches are formed on said film slantingly to its moving direction.

7. The method for producing a straight-tearable thermoplastic resin film according to claim 1, wherein an endless pattern belt comprising small pattern rolls each having a large number of fine hard particles on the surface in parallel, which is long enough to slantingly cover the film, is arranged on said film slantingly to its moving direction such that each small pattern roll can be in sliding contact with said film; and wherein said endless pattern belt is rotated in an upstream direction of said film to continuously bring said small pattern rolls into sliding contact with said film, whereby said linear scratches can be formed on said film substantially in its width direction by adjusting operation conditions.

8. The method for producing a straight-tearable thermoplastic resin film according to claim 7, wherein an endless brush comprising a large number of hairs on an endless belt, which is long enough to slantingly cover the film, is arranged on said endless pattern belt via said film; and wherein said endless brush is rotated to continuously bring said hairs into sliding contact with said film, such that said hairs press said film to said small pattern rolls of said endless pattern.

9. The method for producing a straight-tearable thermoplastic resin film according to claim 1, wherein at least two pattern rolls each having an axial direction slanting to the moving direction of said film and vertically movable guide means for independently moving said pattern rolls are arranged; wherein each roll slidably moves on said film from one end to the other, and is repeatedly subjected to a cycle of moving away from said film after reaching the other end and returning to the original position, during which the movement of said pattern rolls is controlled such that at least any one of said pattern rolls is always in sliding contact with said film over its entire width, whereby said linear scratches can be formed on said film substantially in its width direction by adjusting operation conditions.

10. The method for producing a straight-tearable thermoplastic resin film according to claim 1, wherein at least two parallel roll trains each comprising small pattern rolls each having a large number of fine hard particles on the surface are arranged on said film slantingly to its moving direction; wherein vertically movable guide means for independently moving said roll trains slantingly to the moving direction of said film are arranged; wherein each roll train slidably moves on said film from one end to the other, and is repeatedly subjected to a cycle of moving away from said film after reaching the other end and returning to the original position, during which the movement of said roll trains is controlled such that at least any one of said roll trains is always in sliding contact with said film over its entire width, whereby said linear scratches can be formed on said film substantially in its width direction by adjusting operation conditions.

* * * * *